(12) United States Patent
Han (10) Patent No.: US 12,500,252 B2
(45) Date of Patent: Dec. 16, 2025

(54) APPARATUS FOR CONTROLLING FUEL CELL AND METHOD OF OPERATING SAME

(71) Applicants: HYUNDAI MOTOR COMPANY, Seoul (KR); KIA CORPORATION, Seoul (KR)

(72) Inventor: Wook Hyun Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 688 days.

(21) Appl. No.: 17/897,494

(22) Filed: Aug. 29, 2022

(65) Prior Publication Data

US 2023/0163331 A1 May 25, 2023

(51) Int. Cl.
*H01M 8/04* (2016.01)
*H01M 8/04537* (2016.01)
*H01M 8/04955* (2016.01)

(52) U.S. Cl.
CPC ... *H01M 8/04626* (2013.01); *H01M 8/04955* (2013.01); *H01M 2250/20* (2013.01)

(58) Field of Classification Search
CPC ......... H01M 8/04626; H01M 8/04955; H01M 2250/20
USPC ......................................................... 429/400
See application file for complete search history.

(56) References Cited

U.S. PATENT DOCUMENTS

| 2002/0162694 A1* | 11/2002 | Iwasaki | B60L 58/13 429/430 |
| 2016/0046204 A1* | 2/2016 | Oh | B60L 58/40 701/22 |
| 2022/0348113 A1* | 11/2022 | Delrieu | B60L 53/22 |

* cited by examiner

*Primary Examiner* — James M Erwin
(74) *Attorney, Agent, or Firm* — MCDONNELL BOEHNEN HULBERT & BERGHOFF LLP (57) ABSTRACT

An apparatus for controlling a fuel cell includes the fuel cell, a battery, and a control device electrically connected to the fuel cell and the battery, wherein the control device may identify a residual current capacity (SOC) of the battery, and suspend power generation off of the fuel cell based on whether a vehicle is driven when the SOC is identified to be in an overcharge state of exceeding a set reference value.

18 Claims, 8 Drawing Sheets

APPARATUS FOR CONTROLLING FUEL CELL AND METHOD OF OPERATING SAME

CROSS REFERENCE TO RELATED APPLICATIONS

This application claims the benefit of priority to Korean Patent Application No. 10-2021-0161627, filed in the Korean Intellectual Property Office on Nov. 22, 2021, the entire contents of which are incorporated herein by reference.

TECHNICAL FIELD

The present disclosure relates to an apparatus for controlling a fuel cell capable of reducing power consumption caused when an operation mode of a fuel cell is changed, and a method of operating the same.

BACKGROUND

An internal combustion engine vehicle, which uses fossil fuels such as gasoline, diesel, or the like may cause environmental pollution due to exhaust gas, global warming due to carbon dioxide, and respiratory diseases due to ozone generation.

In order to solve such problems, a vehicle that uses a fuel cell as a power source or an auxiliary power source such as a battery while using fuel cell as a main power source has been developed.

In such a vehicle, in order to improve the power generation efficiency of a fuel cell and thereby increase fuel efficiency (or energy efficiency), the operation of a driving motor may be turned off when the vehicle is stopped and the operation of the driving motor may be resumed when the vehicle starts. In addition, regenerative braking for charging a battery by recovering braking and inertia energy through the power generation operation of the driving motor is performed when the vehicle is braking or coasting due to inertia.

SUMMARY

The present disclosure has been made to solve the above-mentioned problems occurring in the prior art while advantages achieved by the prior art are maintained intact.

In general, a fuel cell may operate in a power generation off mode to turn off the operation of a driving motor, and may operate in a power generation on mode to resume the operation of the driving motor. In addition, in a situation in which regenerative braking is performed, the fuel cell may operate in a low output mode in which the generated power is reduced to a certain level in order to increase the recovery rate of the regenerative braking.

However, power consumption may occur when the operation mode of the fuel cell is changed, for example, when the power generation off mode is changed to the power generation on mode, or when the low output mode is changed to the power generation on mode.

Figure 1:
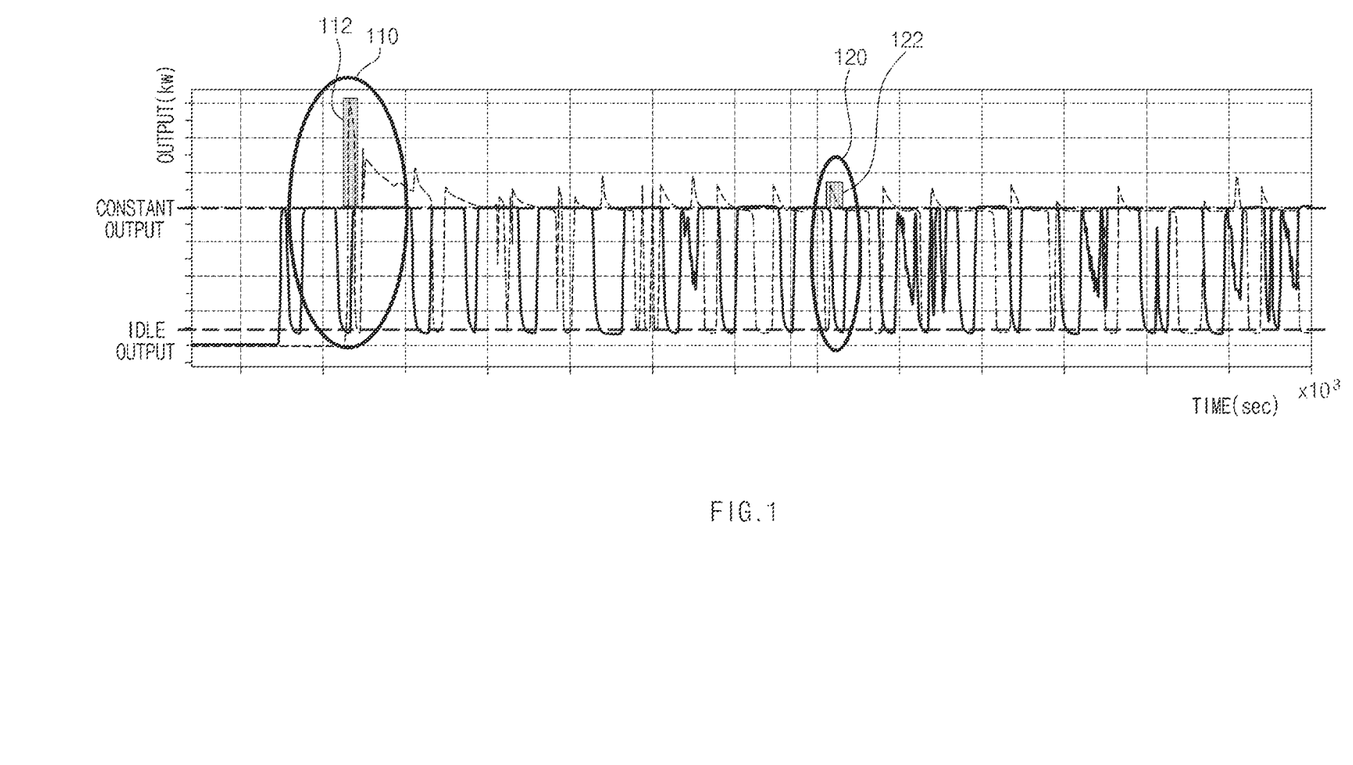
FIG. 1 is a view illustrating power consumption according to a change in an operation mode of a fuel cell.

For example, as shown in FIG. 1, when the fuel cell is changed from the power generation off mode to the power generation on mode in 110, the generated power of the fuel cell is excessively output to a certain level or more, and then output to a constant power in 112. This is unintentional power consumption caused when the operation mode of the fuel cell is changed. In a situation in which a vehicle starts/stops frequently, the power consumption may further increase, thereby reducing the power generation efficiency of the fuel cell.

In addition, when the regenerative braking is stopped, the fuel cell may operate in the power generation on mode again after releasing the low power mode. In this case, as confirmed through FIG. 1, even at the time point 120 when the power generation on mode of the fuel cell is resumed, the generated power of the fuel cell may be output to a certain level or more, and then may be constantly output at 122, thereby consuming the power of the fuel cell.

An aspect of the present disclosure provides an apparatus for controlling a fuel cell and a method of operating the same that can reduce power consumption generated as an operation mode of the fuel cell is changed, thereby improving power generation efficiency of the fuel cell.

Another aspect of the present disclosure provides an apparatus for controlling a fuel cell and a method of operating the same that can suspend power generation off of the fuel cell when it is determined that the vehicle is in a normal driving state even if the remaining current capacity of the battery (State of Charge) satisfies a power generation off condition.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a fuel cell includes the fuel cell, a battery, and a control device electrically connected to the fuel cell and the battery, wherein the control device may identify a residual current capacity (SOC) of the battery, and suspend power generation off of the fuel cell based on whether a vehicle is driven when the SOC is identified to be in an overcharge state of exceeding a set reference value.

According to various embodiments, the control device may suspend power generation off of the fuel cell when normal driving of the vehicle is identified in the overcharge state.

The control device may turn off power generation of the fuel cell only when idling of the vehicle is identified in the overcharged state.

The control device may suspend the power generation off of the fuel cell and operate in a power generation-on mode.

The control device may suspend the power generation off of the fuel cell and operate in a low output mode in which power reduced to a specified level is generated.

The control device may store power generated by regenerative braking in the battery while the power generation off of the fuel cell is suspended.

The control device may operate the fuel cell in one of a power generation-on mode or a low output mode in which power reduced to a certain level is generated while the regenerative braking is performed.

The control device may determine an operation mode of the fuel cell based on power generated by the regenerative braking and power generated from the fuel cell.

The control device may operate the fuel cell in the low output mode when the sum of the power generated by the regenerative braking and the power generated from the fuel cell exceeds a specified level.

The control device may determine whether the vehicle is driven based on a change amount of the SOC exceeding the set reference value.

According to another aspect of the present disclosure, a method of controlling a fuel cell may identifying a residual current capacity (SOC) of the battery, and suspending power generation off of the fuel cell based on whether the vehicle is driven when the SOC is identified to be in an overcharge state of exceeding a set reference value.

The method may further include suspending power generation off of the fuel cell when normal driving of the vehicle is identified in the overcharge state.

The method may further include turning off power generation of the fuel cell only when idling of the vehicle is identified in the overcharged state.

The method may further include suspending the power generation off of the fuel cell and operate in a power generation-on mode.

The method may further include suspending power generation off of the fuel cell and operating in a low output mode in which power reduced to a specified level is generated.

The method may further include storing power generated by regenerative braking in the battery while the power generation off of the fuel cell is suspended.

The method may further include operating the fuel cell in one of a power generation-on mode or a low output mode in which power reduced to a certain level is generated while the regenerative braking is performed.

The method may further include determining an operation mode of the fuel cell based on power generated by the regenerative braking and power generated from the fuel cell.

The method may further include operating the fuel cell in the low output mode when the sum of the power generated by the regenerative braking and the power generated from the fuel cell exceeds a specified level.

The method may further include determining whether the vehicle is driven based on a change amount of the SOC exceeding the set reference value.

Additional features and advantages are described herein, and will be apparent from, the following Detailed Description and the figures.

BRIEF DESCRIPTION OF THE FIGURES

The above and other objects, features and advantages of the present disclosure will be more apparent from the following detailed description taken in conjunction with the accompanying drawings.

With regard to description of drawings, the same or similar elements may be marked by the same or similar reference numerals.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, a vehicle may include a vehicle operated by a driver's boarding and manipulation and an autonomous vehicle having a function of operating by itself without a driver's manipulation. In addition, in the following description, an automobile is described as an example of a vehicle, but the embodiments are not limited thereto. For example, the following various embodiments may be applied to various transportation means such as ships, airplanes, trains, motorcycles, bicycles, or the like. Hereinafter, the embodiments of the present disclosure will be described in detail with reference to FIGS. 2 to 8.

Figure 2:
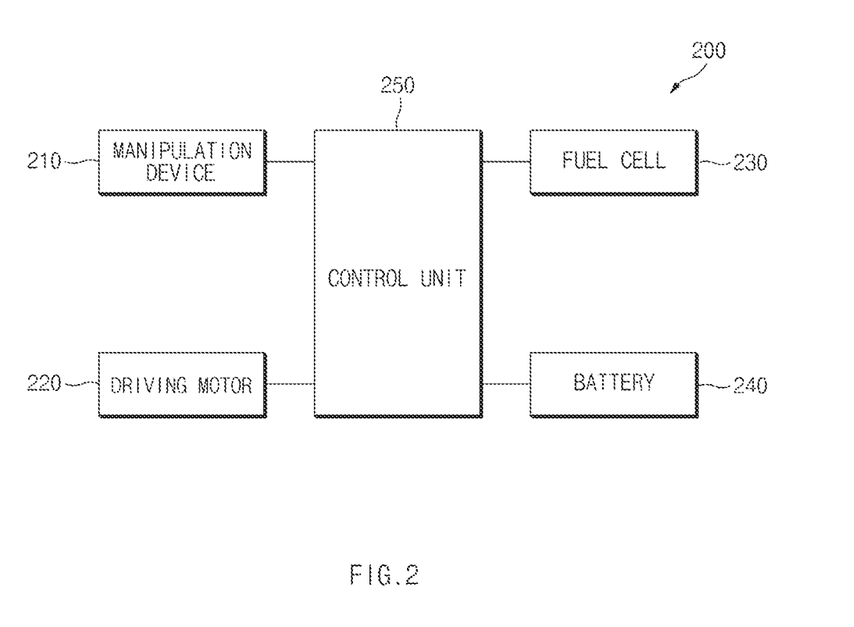
FIG. 2 is a block diagram illustrating a vehicle according to various embodiments of the present disclosure.

FIG. 2 is a block diagram illustrating a vehicle 200 according to various embodiments of the present disclosure.

Referring to FIG. 2, the vehicle 200 according to various embodiments may include a manipulation device 210, a driving motor 220, a fuel cell 230, a battery 240, and a control device 250. However, this is only an example, and various embodiments are not limited thereto. For example, at least one of the above-described components of the vehicle 200 may be omitted or one or more other components (e.g., an autonomous driving module or a display module) may be added as a configuration of the vehicle 200.

According to various embodiments, the manipulation device 210 may receive a user input for driving. According to an embodiment, the manipulation device 210 may include a steering input device (e.g., a steering wheel), an accelerator input device (e.g., an accelerator pedal), and a brake input device (e.g., a brake pedal). However, this is only an example, and the present document is not limited thereto. For example, devices for operating seat heating wires, interior lights, radios, navigation, direction indicators, tail lamps, headlamps, wipers, air conditioners, and the like mounted in the vehicle 200 may be configured as at least a part of the manipulation device 210.

According to various embodiments, the driving motor 220 may generate power for driving the vehicle 200. According to an embodiment, the power generated by the driving motor 220 may be transmitted to an axle via a transmission device and a differential gear device. Accordingly, the wheel is rotated by the axle, thereby driving the vehicle 200. A transmission device, a differential gear device, an axle, and a wheel are well known through many documents, and detailed description thereof will be omitted in this document.

According to various embodiments, the fuel cell 230 (or fuel cell stack) may supply power to the driving motor 220. Accordingly, the driving motor 220 may be driven by power supplied through the fuel cell 230 to generate power for driving the vehicle 200.

According to an embodiment, the fuel cell 230 may be a kind of power generation device that generates power by receiving and reacting hydrogen and oxygen, and may supply the generated power to the driving motor 220 and/or the battery 240. For example, the fuel cell 230 may include a plurality of fuel cell cells (e.g., unit cell).

According to various embodiments, the battery 240 may store power generated by the fuel cell 230. In addition, the battery 240 may store power recovered by regenerative braking of the vehicle 200. As described above, the power stored in the battery 240 may be supplied to the driving motor 220 to enable the vehicle 200 to travel.

According to various embodiments of the present disclosure, the control device 250 may be electrically connected to at least one component (e.g., the manipulation device 210, the driving motor 220, the fuel cell 230, and/or the battery 240) installed in the vehicle 200, and may perform an overall operation of the vehicle 200. For example, the control device 250 may include an electronic control device.

According to an embodiment, the control device 250 may control the operation mode of the fuel cell 230. The operation mode of the fuel cell 230 may include a power generation on mode in which power is generated, a power generation off mode in which power generation is stopped, and a low output mode in which power reduced to a certain level is generated. For example, the control device 250 may process the fuel cell 230 to operate in the power generation on mode in a situation in which power supply to the driving motor 220 is required, and in a situation in which power supply to the driving motor 220 is limited, process the fuel cell 230 to operate in the power generation off mode. In addition, the control device 250 may process the fuel cell 230 to operate in the low output mode while regenerative braking is performed.

The above-described operation mode of the fuel cell 230 may be changed according to the driving state of the vehicle 200.

For example, when the vehicle 200 is braked (e.g., when an input is applied to the brake input device or when the input to the acceleration input device is released), the operation mode of the fuel cell 230 may be changed from the power generation on mode to the power generation off mode (or low output mode). As another example, when the vehicle 200 is driven (e.g., when an input to the brake input device is released or an input is applied to the acceleration input device), the operation mode of the fuel cell 230 may be changed from the power generation off mode (or low power output mode) to the power generation on mode. In particular, in a city driving situation in which driving and braking of the vehicle 200 are frequently performed, the operation mode may be changed frequently, and the power generation efficiency of the fuel cell 230 may decrease due to power consumption caused by the operation mode change.

In order to solve this problem, the control device 250 according to various embodiments may tighten the operation mode change condition for the fuel cell 230. For example, when the operation mode of the fuel cell 230 is changed from the power generation off mode to the power generation on mode than when the operation mode is changed from the low output mode to the power generation on mode, relatively greater power consumption may occur. Accordingly, the control device 250 may reduce power consumption by strengthening the entry condition to the power generation off mode.

As described above, as the entry condition into the power generation mode is strengthened, it is possible to prevent the operation mode of the fuel cell 230 from being frequently changed to the power generation off mode, and as a result, the power generation efficiency of the fuel cell 230 may be improved. However, this is only an example, and the strengthened operation mode change condition is not limited to the entry condition into the power generation off mode.

In relation to strengthening the entry condition into the power generation off mode, it will be described with reference to FIGS. 3 and 4 below.

Figure 3:
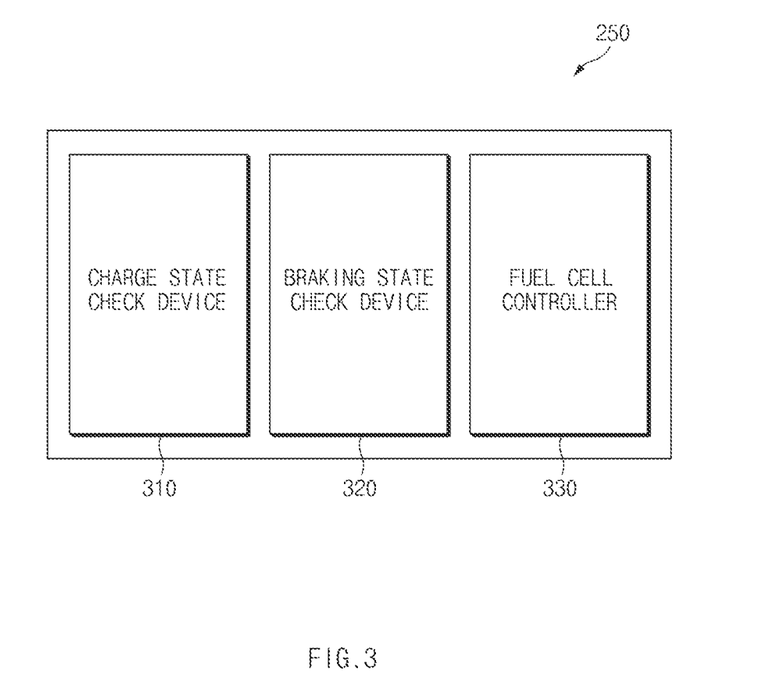
FIG. 3 is a block diagram illustrating a control device according to various embodiments.

FIG. 3 is a block diagram illustrating the control device 250 according to various embodiments. FIG. 4 is a view illustrating an operation mode of the fuel cell 230 according to various embodiments.

Referring to FIG. 3, the control device 250 according to various embodiments may include a charge state check device 310, a braking state check device 320, and a fuel cell controller 330. However, this is only an example, and various embodiments are not limited thereto. For example, at least one of the above-described components of the control device 250 may be omitted or one or more other components may be added as a component of the control device 250. In addition, depending on the implementation, at least one of the components of the above-described control device 250 may be operated as one integrated with other components or may be operated independently from the control device 250.

According to various embodiments, the charge state check device 310 may monitor the remaining current capacity (or state of charge) of the battery 240, and provide the monitoring result to the fuel cell controller 330. According to an embodiment, the charge state check device 310 may measure the current and voltage of the battery 240 continuously or periodically, and may identify the SOC of the battery 240 based on the current and voltage.

According to various embodiments, the braking state check device 320 may determine the braking state of the vehicle 200. The braking state may be related to the braking torque generated by the driving motor 220.

According to an embodiment, the braking state check device 320 may determine that the vehicle 200 is in a state in which braking is caused based on a torque value having a negative value (−) of the driving motor 220. In addition, the braking state check device 320 may determine that the vehicle 200 is in a state in which braking is not caused based on the torque value having a positive (+) value of the driving motor 220.

According to various embodiments, the fuel cell controller 330 may control the operation mode of the fuel cell 230. For example, the fuel cell controller 330 may prevent the operation mode of the fuel cell 230 from being frequently changed based on the entry condition into the enhanced power generation off mode.

Prior to a detailed description of the fuel cell controller 330, the entry condition into the general power generation off mode and the entry condition into the enhanced power generation off mode according to the present disclosure may be summarized as follows.

The entry condition into the general power generation off mode may include a case in which the SOC of the battery 240 meets the power generation off condition (e.g., an overcharge state in which the SOC is greater than or equal to a set reference value). For example, according to the entry condition into the general off mode, when the SOC of the battery 240 satisfies the power generation off condition, the fuel cell 230 operates in the power generation off mode. To the contrary, when the SOC of the battery 240 does not satisfy the power generation off condition (e.g., the SOC is less than a set reference value), the battery 240 operates in the power generation on mode.

Figure 4:
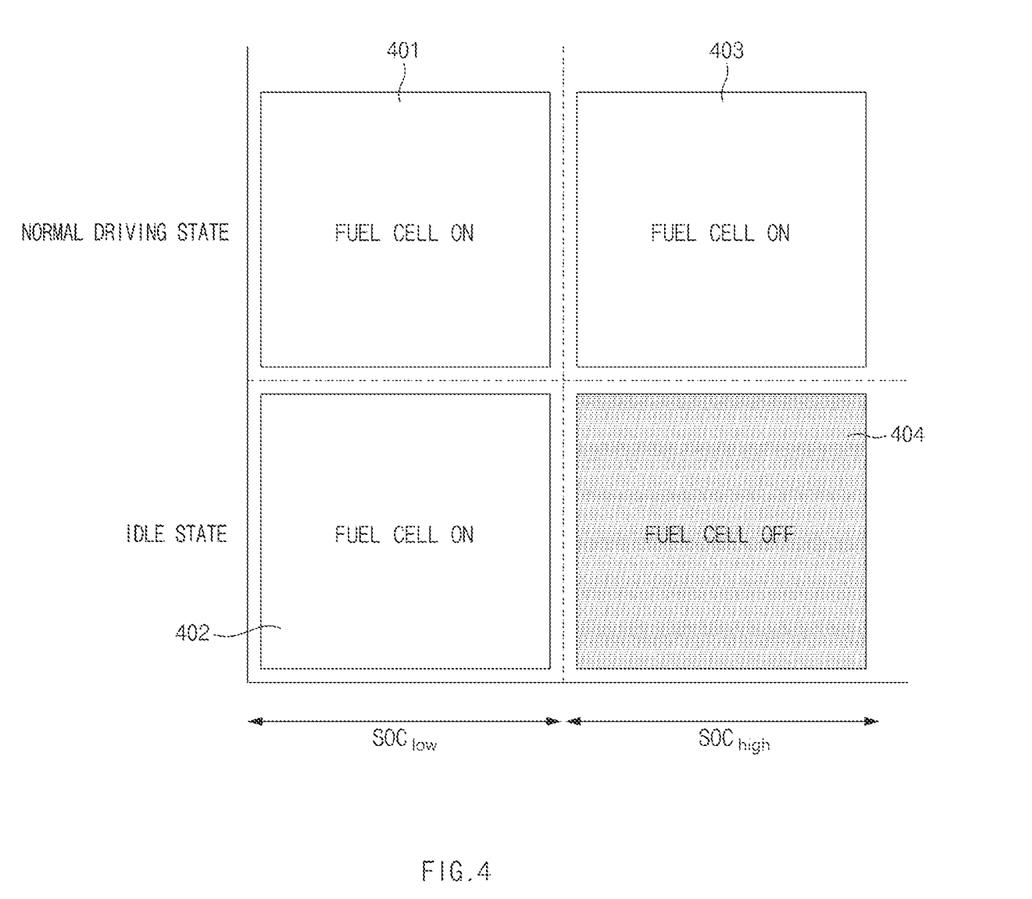
FIG. 4 is a view illustrating an operation mode of the fuel cell according to various embodiments.

To the contrary, the enhanced entry condition into the power generation off mode according to various embodiments, as shown in FIG. 4, even if the SOC of the battery 240 satisfies the power generation off condition, the power generation off of the fuel cell 230 may be suspended when it is determined the vehicle 200 is in the normal driving state.

In other words, when the SOC of the battery 240 does not satisfy the power generation off condition (e.g., a state ($SOC_{low}$) in which the SOC is less than a set reference value) 401 and 402, and it is determined that the vehicle 200 is in a normal driving state even if the SOC of the battery 240 satisfies the power generation off condition ($SOC_{high}$), the fuel cell 230 may operate in the power generation on mode. The fuel cell 230 may operate in the generation off mode only when the SOC of the battery 240 satisfy the generation off condition and it is determined that the vehicle 200 is in an idle state 404.

Hereinafter, the fuel cell controller 330 for controlling the operation mode of the fuel cell 230 based on the enhanced entry condition to the power generation off mode will be described.

According to various embodiments, the fuel cell controller 330 may consider the state of charge of the battery 240 when determining the operation mode of the fuel cell 230. For example, the fuel cell controller 330 may determine whether the battery 240 is overcharged based on the SOC of the battery 240 measured by the charge state check device 310.

In this regard, when the SOC of the battery 240 is less than a set reference value (e.g., 69%) (or when the battery 240 is not in an overcharge state), the fuel cell controller 330 may operate the fuel cell 230 in the power generation on mode.

In addition, when the SOC of the battery 240 is equal to or greater than a set reference value (or is in an overcharge state), the fuel cell controller 330 may additionally consider the driving state to determine the operation mode of the fuel cell 230 of the vehicle 200. The driving state may include a normal driving state in which the driving motor 220 is in a load state (e.g., a state in which the start is turned on and the speed is '0' (zero) or higher) and an idling state in which the driving motor 220 is in a no-load state (e.g., a state in which the start is turned on and the speed is '0').

For example, the fuel cell controller 330 operates the fuel cell 230 in the power generation off mode only when it is determined that the SOC of the battery 240 is equal to or greater than a set reference value and the vehicle 200 is in the idling state. In this case, the fuel cell controller 330 may supply power from the battery 240 to the driving motor 220 so that the power sufficiently stored in the battery 240 is consumed (or discharged).

In relation to determining the driving state, the fuel cell controller 330 may monitor a change in the SOC of the battery 240 in the overcharge state. For example, in the normal driving state of the vehicle 200, the power of the battery 240 is supplied to the driving motor 220, so that the increase in the SOC of the battery 240 may not be large. To the contrary, in the idling state of the vehicle 200, the power of the battery 240 supplied to the driving motor 220 may be relatively low, so that the increase in the SOC of the battery 240 is relatively large.

In this case, the fuel cell controller 330 according to an embodiment may determine that the vehicle 200 is in an idle state when the SOC of the battery 240 exceeding the set reference value reaches the limit SOC value (or the maximum SOC (e.g., 70%) allowed by the battery 240) within a specified time. When the SOC of the battery 240 does not reach the limit SOC value, the controller 330 may determine that the vehicle 200 is in a normal driving state. Additionally or alternatively, when determining the driving state, the fuel cell controller 330 may change the operation mode of the fuel cell 230 to the low power mode at the time point when the SOC of the battery 240 exceeds the reference value.

For example, when the fuel cell 230 generates power in a state in which the SOC exceeds the reference value (or operates in the power generation on mode), the SOC of the battery 240 may reach the limit SOC value in a short time. This may lead to a situation in which the driving state is incorrectly determined. However, this problem may be solved by causing the fuel cell 230 to operate in the low power mode.

However, this is only an example, and various embodiments are not limited thereto. For example, the driving state may be determined based on whether an accelerator input device (e.g., an accelerator pedal), a brake input device (e.g., a brake pedal), or a speed change device is operated.

As another example, when it is determined that the SOC of the battery 240 is greater than or equal to the set reference value but the vehicle 200 is in the normal driving state, the fuel cell controller 330 may suspend the operation of the fuel cell 230 in the power generation off mode.

In other words, although the current battery 240 is in an overcharge state, the SOC of the battery 240 may be reduced to less than the set reference value by power consumed by the normal driving of the vehicle 200. Accordingly, when it is determined that the SOC of the battery 240 is greater than or equal to the set reference value but the vehicle 200 is in a normal driving state, the fuel cell controller 330 may cause the fuel cell 230 to operate in the power generation on mode, so that it is possible to reduce the frequency of operating in the power generation off mode. As described above, by the operation of the fuel cell 230, power may be generated and supplied to the battery 240 even when the SOC of the battery 240 is greater than or equal to the set reference value.

According to an embodiment, the fuel cell controller 330 monitors the change amount of the SOC of the battery 240 before the fuel cell 230 is operated in the power generation on mode, and when it is determined that the SOC less than the set reference value is checked, the fuel cell 230 may be operated in the power generation on mode.

Meanwhile, a situation in which relatively little power is consumed by normal driving of the vehicle 200 in a state in which the SOC of the battery 240 is greater than or equal to the set reference value and the fuel cell 230 operates in the power generation on mode may not be excluded. In other words, when power generation is continued by the fuel cell 230 in a situation in which the SOC of the battery 240 is not reduced below the set reference value, the generated power may be continuously stored in the battery 240 in an overcharge state so that not only the lifespan of the battery 240 is shortened, but there is also a risk of explosion.

To solve the above described problem, when it is determined that the SOC of the battery 240 is greater than or equal to a set reference value but the vehicle 200 is in a normal driving state. The fuel cell controller 330 according to various embodiments of the present disclosure may allow the fuel cell 230 operate in a low output mode instead of the power generation on mode.

As described above, when the fuel cell 230 is operated in the power generation on mode, the power generated by regenerative braking and the power generated by the fuel cell 230 may be supplied to the battery 240.

In general, the battery 240 and the driving motor 220 may be connected by a wiring connection including a plurality of connector terminals and cables. Such wiring may have a certain allowable capacity, and when power exceeding the allowable capacity is supplied, the wiring may be damaged, thereby limiting smooth power supply in the vehicle 200.

In order to solve the problem, the fuel cell controller 330 according to various embodiments of the present disclosure may control the operation mode based on the charging power required for the battery 240 and the allowable capacity of the wiring in a situation in which the fuel cell 230 operates in the power generation on mode. For example, the charging required power is the total power supplied to the battery 240, and may be calculated as a sum of power generated by regenerative braking and power generated by the fuel cell 230.

According to an embodiment, when the calculated charging required power does not exceed the allowable capacity of wiring, the fuel cell controller 330 may cause the fuel cell 230 to maintain the power generation on mode. To the contrary, when the calculated charging required power exceeds the allowable capacity of the wiring, the fuel cell controller 330 may cause the fuel cell 230 to release the power generation on mode and operate in the low output mode.

As described above, the control device (or the fuel cell controller 330) according to various embodiments may suspend the power generation off of the fuel cell 230 based on the set reference value (e.g., a reference value used to determine overcharge) and the limit SOC value (e.g., a reference value used to determine the driving state).

According to various embodiments, the reference value and the limit SOC value may be set within a range that satisfies the regenerative braking law.

For example, the criteria for testing the regenerative braking may be different for each country. For example, in certain countries, the vehicle model, inclination, and moving speed are defined as the regenerative braking test conditions, and in some other countries, the vehicle model and the number of passengers are defined as the regenerative braking test conditions.

Accordingly, when the reference value and the limit SOC value according to the present disclosure are set to meet the conditions required by the corresponding country, the change in the operation mode of the fuel cell 230 may be minimized while satisfying the regenerative braking condition.

For example, the reference value and the limit SOC value may be set based on the regenerative braking power calculated in consideration of the slope, regenerative braking distance, regenerative braking time, and the like required by the country, the power generated in a state that power off is suspended and the maximum SOC of the battery 240.

Figure 5:
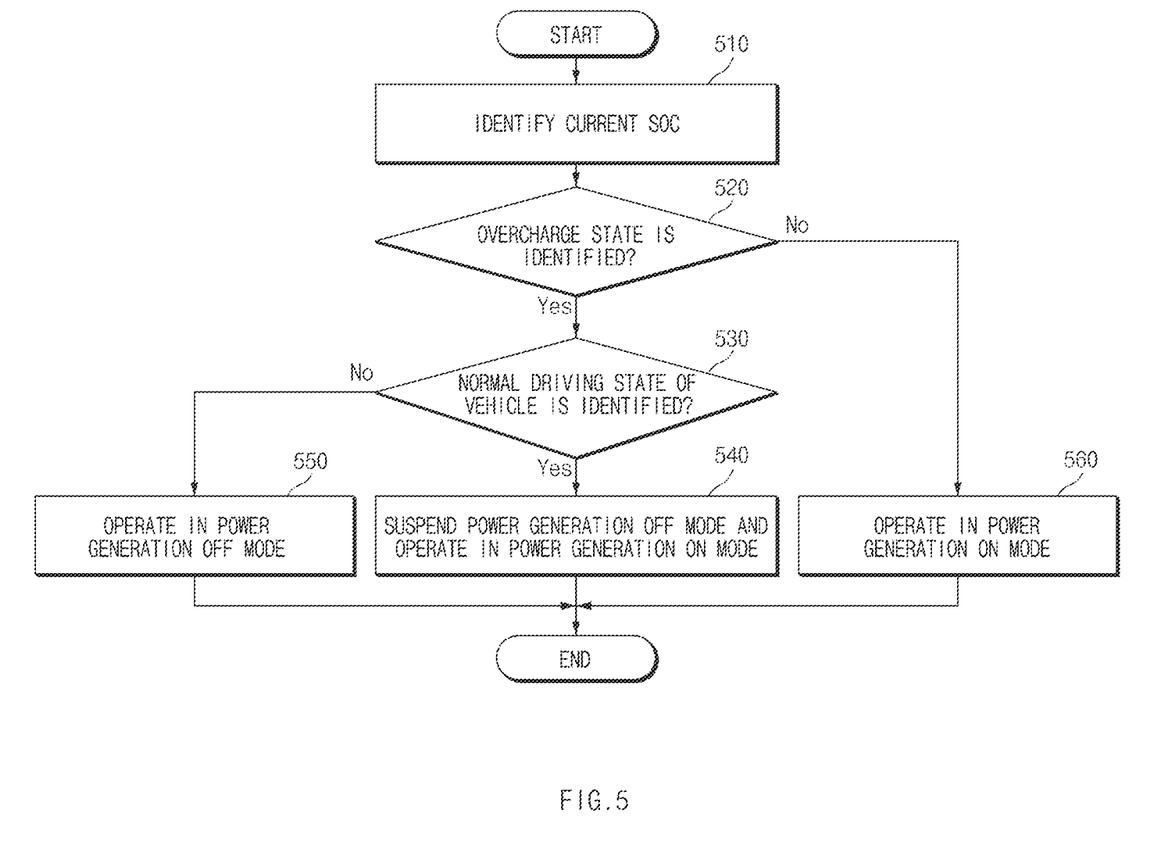
FIG. 5 is a flowchart illustrating an operation of controlling an operation mode of a fuel cell according to various embodiments.

FIG. 5 is a flowchart illustrating an operation of controlling an operation mode of the fuel cell 230 according to various embodiments. Each operation in the following embodiments may be performed sequentially, but is not necessarily performed sequentially. For example, the order of each operation may be changed, and at least two operations may be performed in parallel. In addition, at least one of the following operations may be omitted according to an embodiment.

Referring to FIG. 5, the control device 250 (or the fuel cell controller 330) according to various embodiments may check the SOC of the battery 240 in operation 510. According to an embodiment, the control device 250 may continuously or periodically measure the current and voltage of the battery 240 and check the SOC of the battery 240 based on the current and voltage.

According to various embodiments, in operation 520, the control device 250 (or the fuel cell controller 330) may determine whether an overcharge state of the battery 240 is detected. According to an embodiment, the control device 250 may determine whether the SOC exceeds a set reference value (e.g., a reference value used to determine overcharge).

According to various embodiments, when the overcharge state of the battery 240 is not detected, in operation 560, the control device 250 (or the fuel cell controller 330) may cause the fuel cell 230 to operate in a generation on state.

According to various embodiments of the present disclosure, when an overcharge state of the battery 240 is detected, the control device 250 (or the fuel cell controller 330) may determine the driving state of the vehicle 200 in operation 530. The driving state of the vehicle 200 may include a normal driving state in which the driving motor 220 is in a load state (e.g., a state in which the engine is turned on and the speed is '0' or higher) and an idle state in which the driving motor 220 is in a no-load state (e.g., a state in which the engine is turned on or the speed is '0').

According to various embodiments, when it is determined that the vehicle 200 is in a normal driving state, in operation 540, the control device 250 (or the fuel cell controller 330) may hold the fuel cell 230 operating in the power generation off mode. According to an embodiment, the control device 250 may cause the fuel cell 230 to operate in the power generation on mode when it is determined that the vehicle 200 is in a normal driving state even if the SOC of the battery 240 satisfies the power generation off condition.

According to various embodiments, when it is determined that the vehicle 200 is in an idle state, in operation 550, the control device 250 (or the fuel cell controller 330) may cause the fuel cell 230 to operate in the power generation off mode. According to an embodiment, the control device 250 may limit the power generation of the fuel cell 230 only when the SOC of the battery 240 satisfies the power generation off condition and it is determined that the vehicle 200 is in an idle state.

Figure 6:
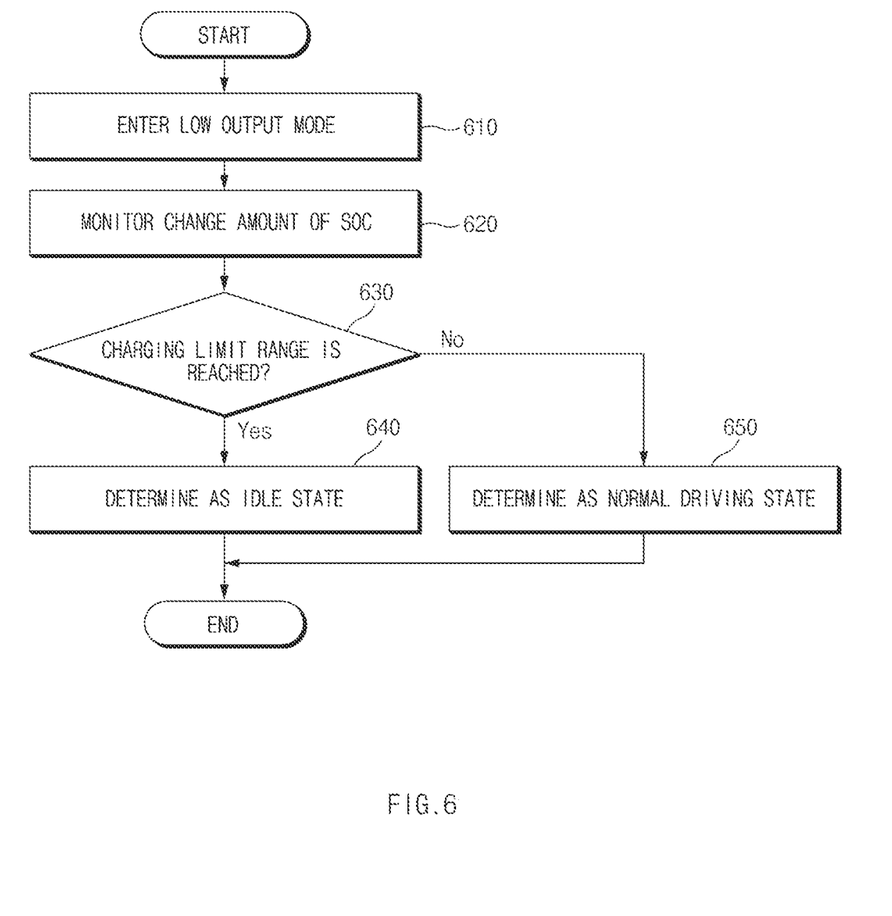
FIG. 6 is a flowchart illustrating an operation of determining the driving state of a vehicle by a control device according to various embodiments.

FIG. 6 is a flowchart illustrating an operation of determining the driving state of the vehicle 200 by the control device 250 according to various embodiments. The operations of FIG. 6 described below may represent various embodiments of operation 530 of FIG. 5. In addition, each operation in the following embodiments may be performed sequentially, but is not necessarily performed sequentially. For example, the order of each operation may be changed, and at least two operations may be performed in parallel. In addition, at least one of the following operations may be omitted according to an embodiment.

Referring to FIG. 6, in operation 610, the control device 250 (or the fuel cell controller 330) according to various embodiments may cause the fuel cell 230 to operate in a low power mode in response to detecting the overcharge state of the battery 240.

According to various embodiments of the present disclosure, the control device 250 (or the fuel cell controller 330) may monitor a change in the SOC in an overcharge state in operation 620.

According to various embodiments, in operation 630, the control device 250 (or the fuel cell controller 330) may determine whether the SOC of the battery 240 exceeding the set reference value reaches the limit SOC value (or the maximum SOC value allowed by the battery 240) within a specified time. For example, in a normal driving state of the vehicle 200, the power of the battery 240 may be supplied to the driving motor 220 so that the SOC of the battery 240 may not reach the limit SOC value. To the contrary, in the idling state of the vehicle 200, the power of the battery 240 supplied to the driving motor 220 may be relatively low, so that the SOC of the battery 240 may reach the limit SOC value.

According to various embodiments, when the SOC reaches the limit SOC value, the control device 250 (or the fuel cell controller 330) may determine the driving state as the idling state of the vehicle 200 in operation 640.

According to various embodiments, when the SOC does not reach the limit SOC value, in operation 650, the control device 250 (or the fuel cell controller 330) may determine the driving state as the normal driving state of the vehicle 200.

Figure 7:
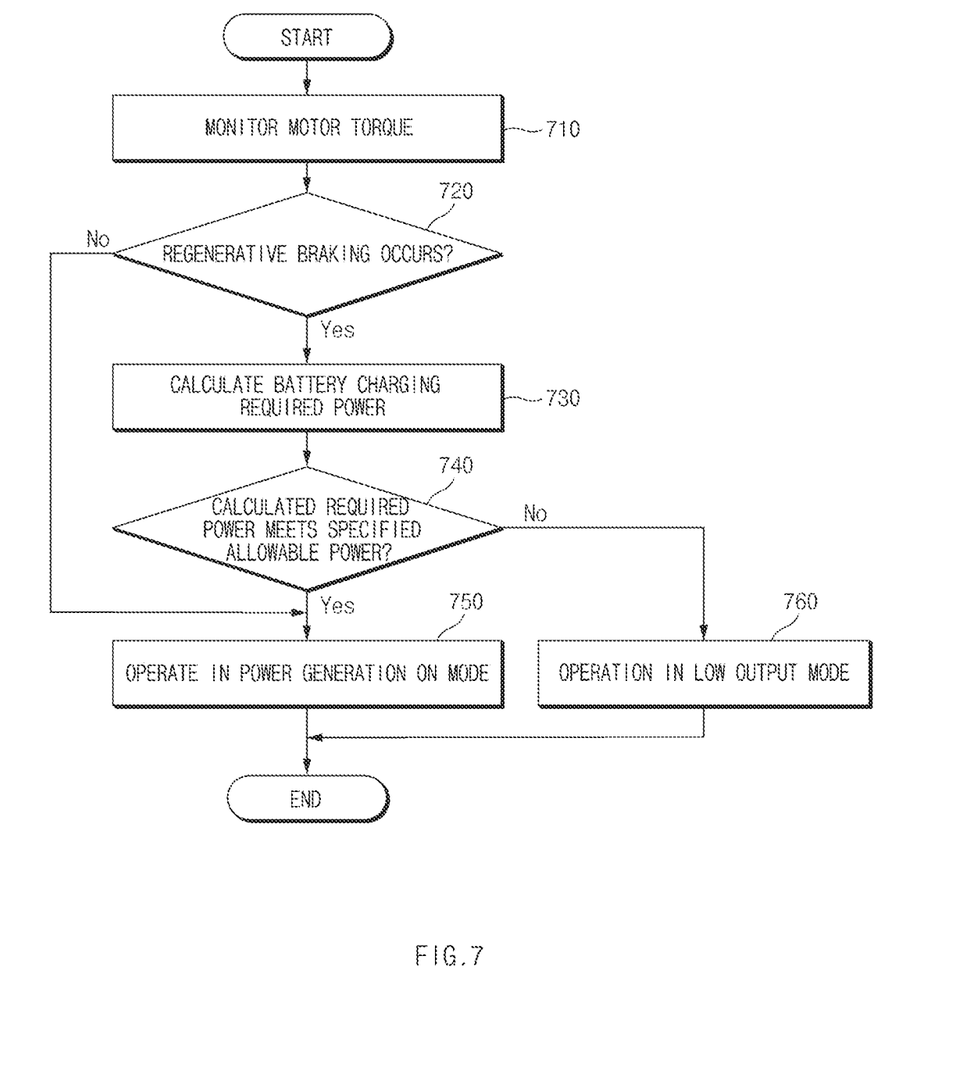
FIG. 7 is a flowchart illustrating an operation of controlling the power generation of a fuel cell by a control device according to various embodiments.

FIG. 7 is a flowchart illustrating an operation of controlling the power generation of the fuel cell 230 by the control device 250 according to various embodiments. Operations of FIG. 7 described below may represent various embodiments of operations 540 and/or 560 of FIG. 5. In addition, each operation in the following embodiments may be performed sequentially, but is not necessarily performed sequentially. For example, the order of each operation may be changed, and at least two operations may be performed in parallel. In addition, at least one of the following operations may be omitted according to an embodiment.

Referring to FIG. 7, the control device 250 (or the fuel cell controller 330) according to various embodiments may monitor the torque of the driving motor 220 in operation 710. According to an embodiment, in response to detecting the overcharge state of the battery 240, the fuel cell 230 may operate in the low power mode.

According to various embodiments, in operation 720, the control device 250 (or the fuel cell controller 330) may determine whether braking occurs for the vehicle 200 based on the torque of the driving motor 220. According to an embodiment, the control device 250 may determine a state in which braking is occurred in the vehicle 200 based on a torque value having a negative value (−) of the driving motor 220. In addition, the control device 250 may determine that the vehicle 200 is in a state in which braking is not caused based on the torque value having a positive (+) value of the driving motor 220.

According to various embodiments, when it is determined that the vehicle 200 is in a state in which braking occurs, in operation 730, the control device 250 (or the fuel cell controller 330) may calculate the charging required power of the battery 240. The charging required power, which is the total power supplied to the battery 240, may be calculated as the sum of power generated by regenerative braking and power generated by the fuel cell 230.

According to various embodiments, the control device 250 (or the fuel cell controller 330) may determine whether the calculated charging required power satisfies a specified allowable capacity in operation 740. The allowable capacity may be the capacity of wiring connecting the battery 240 and the driving motor 220.

According to various embodiments, when the calculated charging required power satisfies the specified allowable capacity, in operation 750, the control device 250 (or the fuel cell controller 330) may cause the fuel cell 230 to operate in the power generation on mode.

According to various embodiments, when the calculated charging required power does not satisfy the specified allowable capacity, in operation 760, the control device 250 (or the fuel cell controller 330) may cause the fuel cell 230 to operate in the low output mode. In other words, the control device 250 may control power within the allowable capacity to be supplied to the battery 240.

Figure 8A:
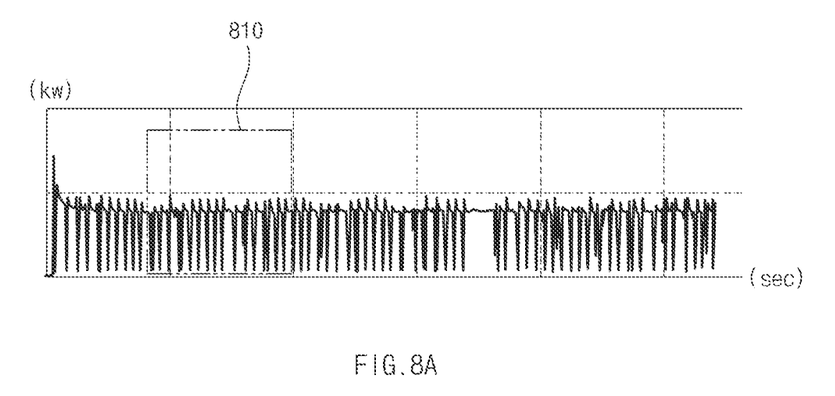
FIGS. 8A and 8B are views illustrating a comparison result of the operating performance of a fuel cell according to various embodiments and the operating performance of a fuel cell according to a comparative example.
Figure 8B:
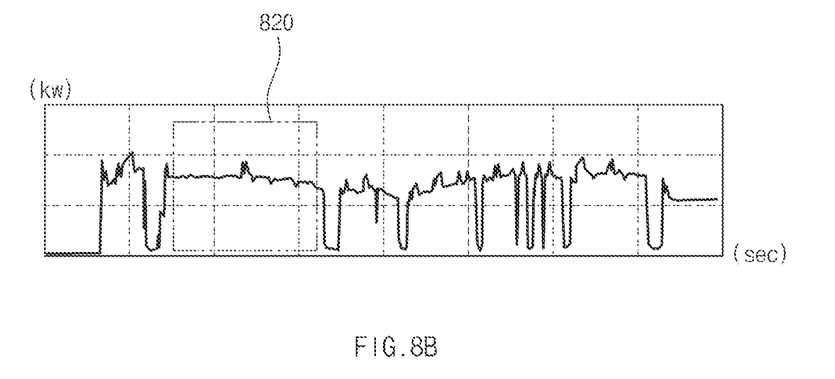

FIG. 8 is a view illustrating a comparison result of the operating performance of the fuel cell 230 according to various embodiments and the operating performance of the fuel cell according to a comparative example.

Referring to FIG. 8, the operating performance of the fuel cell according to the comparative example may mean an operation result based on the entry condition into the general power generation off mode, and the operating performance of the fuel cell 230 according to various embodiments may mean the operation result based on the entry condition into the enhanced power generation off mode.

In detail, as confirmed in FIG. 8A, in the fuel cell according to the comparative example, the change of the operation mode frequently occurs in 810, while, as confirmed in FIG. 8B, in the fuel cell 230 according to various embodiments, the change of the operation mode is relatively small in 820.

Accordingly, it may be understood that the fuel cell 230 according to various embodiments may consume relatively less power compared to the fuel cell according to the comparative embodiment, and thus power generation efficiency may be improved.

An apparatus for controlling a fuel cell and a method of operating the same according to the embodiments disclosed in the present document may prevent unintended power consumption by minimizing a change in the operation mode of the fuel cell, thereby improving the power generation efficiency of the fuel cell.

An apparatus for controlling a fuel cell and a method of operating the same according to the embodiments disclosed in the present document may restrict frequent operation of the fuel cell in the power generation off mode by strengthening the entry condition of the fuel cell into the power generation off mode.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

The invention claimed is:

1. An apparatus for controlling a fuel cell, the apparatus comprising:
a fuel cell;
a battery; and
a control device electrically connected to the fuel cell and to the battery;
wherein the control device is configured to:
identify a residual current capacity (SOC) of the battery; and
suspend a power generation off-mode of the fuel cell based on whether a vehicle is driven when the SOC is identified to be in an overcharge state of exceeding a set reference value;
wherein the control device is further configured to:
turn off power generation of the fuel cell only when idling of the vehicle is identified in the overcharge state.

2. The apparatus of claim 1, wherein the control device is configured to:
suspend the power generation-off-mode of the fuel cell when normal driving of the vehicle is identified in the overcharge state.

3. The apparatus of claim 1, wherein the control device is configured to:
suspend the power generation-off-mode of the fuel cell and operate in a power generation-on mode.

4. The apparatus of claim 1, wherein the control device is configured to:
suspend the power generation-off-mode of the fuel cell and operate in a low output mode in which power reduced to a specified level is generated.

5. The apparatus of claim 1, wherein the control device is configured to:
store power generated by regenerative braking in the battery while the power generation-off-mode of the fuel cell is suspended.

6. The apparatus of claim 5, wherein the control device is configured to:
operate the fuel cell in one of a power generation-on mode or a low output mode in which power reduced to a certain level is generated while the regenerative braking is performed.

7. The apparatus of claim 6, wherein the control device is configured to:
determine an operation mode of the fuel cell based on power generated by the regenerative braking and power generated from the fuel cell.

8. The apparatus of claim 7, wherein the control device is configured to:
operate the fuel cell in the low output mode when the sum of the power generated by the regenerative braking and the power generated from the fuel cell exceeds a specified level.

9. The apparatus of claim 1, wherein the control device is configured to:
determine whether the vehicle is driven based on a change amount of the SOC exceeding the set reference value.

10. A method of controlling a fuel cell, the method comprising:
identifying, by a control device, a residual current capacity (SOC) of a battery; and
suspending, by the control device, a power generation-off-mode of the fuel cell based on whether a vehicle is driven when the SOC is identified to be in an overcharge state of exceeding a set reference value;
wherein the method further comprises:
turning off, by the control device, power generation of the fuel cell only when idling of the vehicle is identified in the overcharged state.

11. The method of claim 10, further comprising:
suspending, by the control device, the power generation-off-mode of the fuel cell when normal driving of the vehicle is identified in the overcharge state.

12. The method of claim 10, further comprising:
suspending, by the control device, the power generation-off-mode of the fuel cell and operate in a power generation-on mode.

13. The method of claim 10, further comprising:
suspending, by the control device, the power generation-off-mode of the fuel cell and operating in a low output mode in which power reduced to a specified level is generated.

14. The method of claim 10, further comprising:
storing, by the control device, power generated by regenerative braking in the battery while the power generation-off-mode of the fuel cell is suspended.

15. The method of claim 10, further comprising:
operating, by the control device, the fuel cell in one of a power generation-on mode or a low output mode in which power reduced to a certain level is generated while the regenerative braking is performed.

16. The method of claim 15, further comprising:
determining, by the control device, an operation mode of the fuel cell based on power generated by the regenerative braking and power generated from the fuel cell.

17. The method of claim 16, further comprising:
operating, by the control device, the fuel cell in the low output mode when the sum of the power generated by the regenerative braking and the power generated from the fuel cell exceeds a specified level.

18. The method of claim 10, further comprising:
determining, by the control device, whether the vehicle is driven based on a change amount of the SOC exceeding the set reference value.

* * * * *